(12) United States Patent
Abe et al.

(10) Patent No.: US 12,060,023 B2
(45) Date of Patent: Aug. 13, 2024

(54) DRIVER AIRBAG DEVICE

(71) Applicant: Autoliv Development AB, Vargarda (SE)

(72) Inventors: Kazuhiro Abe, Kanagawa (JP); Kazuki Morita, Kanagawa (JP); Hiroyoshi Shimono, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/756,694

(22) PCT Filed: Oct. 17, 2020

(86) PCT No.: PCT/JP2020/039198
§ 371 (c)(1),
(2) Date: May 31, 2022

(87) PCT Pub. No.: WO2021/111746
PCT Pub. Date: Jun. 10, 2021

(65) Prior Publication Data
US 2023/0001876 A1    Jan. 5, 2023

(30) Foreign Application Priority Data

Dec. 5, 2019   (JP) .................................. 2019-220388

(51) Int. Cl.
*B60R 21/203*   (2006.01)
*B60R 21/239*   (2006.01)

(52) U.S. Cl.
CPC .......... *B60R 21/203* (2013.01); *B60R 21/239* (2013.01)

(58) Field of Classification Search
CPC . B60R 21/203; B60R 21/2346; B60R 21/239; B60R 2021/23382;
(Continued)

(56) References Cited

U.S. PATENT DOCUMENTS 6,224,093 B1 *   5/2001   Ochiai .................. B60R 21/203
                                                            74/552
6,382,662 B1 *   5/2002   Igawa .................. B60R 21/233
                                                            280/729
(Continued)

FOREIGN PATENT DOCUMENTS

CN         1853988      11/2006
CN       113316533       8/2021
(Continued)

*Primary Examiner* — Laura Freedman
(74) *Attorney, Agent, or Firm* — Foley & Lardner LLP

(57) ABSTRACT

The present invention is an airbag device mounted on a steering wheel of a vehicle having a rim with a shape in which the distance from the center of rotation to the distance to the upper edges is shorter than to left and right edges, that includes a gas generator that generates an expansion gas and an airbag that expands and deploys toward the occupant due to the expansion gas. Furthermore, at the stage before the occupant comes into contact with the expanded and deployed airbag, the thickness (width) D1 of the upper end part of the airbag in the direction parallel to the rotation axis of the steering wheel when the airbag is viewed from the side is configured to be larger than the thickness (width) D2 of the lower end part.

12 Claims, 11 Drawing Sheets

(58) Field of Classification Search
CPC ........... B60R 2021/23514; B60R 2021/23571; B60R 2021/23576
See application file for complete search history.

(56) References Cited

U.S. PATENT DOCUMENTS

| | | | | |
|---|---|---|---|---|
| 7,198,290 | B2* | 4/2007 | Yamada | B60R 21/2338 280/743.2 |
| 7,360,791 | B2* | 4/2008 | Yamada | B60R 21/2338 280/743.2 |
| 7,631,891 | B2* | 12/2009 | Washino | B60R 21/203 280/731 |
| 7,669,890 | B2* | 3/2010 | Bito | B60R 21/203 280/731 |
| 7,775,554 | B2* | 8/2010 | Smydra | B60R 21/2338 280/736 |
| 8,140,227 | B2* | 3/2012 | Imamura | B60R 21/0134 701/41 |
| 8,353,530 | B2* | 1/2013 | Czach | B60R 21/232 280/730.2 |
| 8,899,618 | B2* | 12/2014 | Eckert | B60R 21/2338 280/743.2 |
| 9,126,563 | B2* | 9/2015 | Piccard | B60R 21/239 |
| 9,283,921 | B2* | 3/2016 | Vinton | B60R 21/2346 |
| 10,414,370 | B2* | 9/2019 | Schneider | B60R 21/2338 |
| 11,155,231 | B2* | 10/2021 | Ohno | B60R 21/232 |
| 11,220,230 | B1* | 1/2022 | Faruque | B60R 21/203 |
| 11,254,275 | B2* | 2/2022 | Ishii | B60R 21/2338 |
| 11,260,817 | B2* | 3/2022 | Takahashi | B60R 21/235 |
| 11,370,378 | B2* | 6/2022 | Hotta | B60R 21/2338 |
| 11,383,664 | B2* | 7/2022 | Yamamoto | B60R 21/203 |
| 11,453,357 | B2* | 9/2022 | Morita | B60R 21/26 |
| 2005/0121889 | A1 | 6/2005 | Enders | |
| 2006/0232050 | A1* | 10/2006 | Kumagai | B60R 21/231 280/732 |
| 2007/0046002 | A1 | 3/2007 | Bito | |
| 2013/0181429 | A1* | 7/2013 | Weng | B60R 21/203 280/731 |
| 2018/0281731 | A1* | 10/2018 | Hotta | B60R 21/2338 |
| 2022/0089114 | A1* | 3/2022 | Morita | B60R 21/231 |
| 2022/0144201 | A1* | 5/2022 | Morita | B60R 21/239 |
| 2022/0203920 | A1* | 6/2022 | Morita | B60R 21/203 |
| 2022/0297629 | A1* | 9/2022 | Morita | B60R 21/203 |
| 2022/0306034 | A1* | 9/2022 | Ishii | B60R 21/2338 |
| 2022/0379832 | A1* | 12/2022 | Abe | B60R 21/203 |
| 2023/0415691 | A1* | 12/2023 | Morita | B60R 21/203 |

FOREIGN PATENT DOCUMENTS

| | | | |
|---|---|---|---|
| JP | H0769151 A | * | 3/1995 |
| JP | 2006-298119 A | | 11/2006 |
| JP | 2007-62469 A | | 3/2007 |
| JP | 2008-49858 A | | 3/2008 |
| JP | 2018-20737 A | | 2/2018 |
| JP | 2018-167681 A | | 11/2018 |

* cited by examiner

D1 = 350~400 mm (355 mm)
D2 = 250~320 mm (300 mm)
D3 = 50 mm

DRIVER AIRBAG DEVICE

TECHNICAL FIELD

The present invention relates to an airbag device for a vehicle, and particularly relates to a driver airbag device stored in a steering wheel.

BACKGROUND TECHNOLOGY

The provision of a vehicle with one or more airbags in order to protect the occupants thereof in the event of a vehicle accident is well known. Airbags have various forms, for example, so-called driver airbags that deploy from near the center of the steering wheel to protect the driver, curtain airbags that deploy downward inside the window to protect the occupants in the event of a lateral impact, rollover, or overturning accident, and side airbags that are deployed to the side of the occupant (the side of the seat) to protect the occupant in the event of a lateral impact of the vehicle.

A driver airbag device stowed in a steering wheel must securely restrain the occupant by promptly deploying the airbag, and in that respect, it is important that the deployment shape and deployment posture of the airbag are stable. Regarding a driver airbag device, the rim of the steering wheel functions as a reaction force surface when the airbag is deployed, and this contributes to the stabilization of the deployment shape and the deployment posture of the airbag.

Incidentally, in addition to the general circular shape, steering wheel shapes such as an irregular shape such as an airplane control stick, in which the upper side (twelve o'clock side) and the lower side (6 o'clock side) of the circular shape are missing, are known. For example, in an irregular steering wheel in which the upper side (twelve o'clock side) is missing when compared to a general steering wheel having a circular rim, there is no reaction force received from the rim in the upper part of the airbag facing the head of the occupant. Therefore, when the head of the occupant advances into the expanded airbag, the airbag may be pushed down or greatly deformed, and the restraint performance may be impaired.

Focusing on the lower part of the steering wheel, a situation where the airbag deployed from near the center of the steering wheel quickly expands toward the driver's abdomen (downward) and the driver colliding with the steering wheel must be avoided. In addition, in the case of an irregular steering wheel in which the lower side (6 o'clock side) of the rim is missing when compared to a general steering wheel having a circular rim, the lower region of the airbag must be quickly expanded to restrain near the abdomen of the occupant.

DISCLOSURE OF THE INVENTION

Problem to be Solved by the Invention

In light of the circumstances described above, an object of the present invention is to provide an airbag device that stabilizes the deployment posture of an airbag and contributes to improvement of occupant restraint performance even in a so-called irregular steering wheel.

Means for Solving the Problems

In order to achieve the object described above, the present invention is an airbag device mounted on a steering wheel of a vehicle having a rim having a shape in which the distance from the center of rotation to the upper edge part is shorter than the distance to the left and right edge parts, provided with a gas generating device that generates an expansion gas and an airbag that expands and deploys toward the occupant side due to the expansion gas. Furthermore, at the stage before the occupant comes into contact with the expanded and deployed airbag, the thickness (width) D1 of the upper end part of the airbag in the direction parallel to the rotation axis of the steering wheel when the airbag is viewed from the side is configured to be larger than the thickness (width) D2 of the lower end part.

Note that "a rim with a shape in which the distance from the center of rotation to the left and right edges is shorter than the distance to the upper edge" means that with respect to a normally used circular (annular) rim, a rim where the part corresponding to 12 o'clock when a surface parallel to the rim is viewed as a clock face is missing, extends horizontally, or is formed in a concave shape. Further, the "lower region" and "upper region" of the airbag can be defined as, for example, below the lower end of the rim of the steering wheel and above the upper end of the steering wheel.

According to the present invention having the configuration described above, the thickness of the airbag in the front-to-back direction is larger in the upper region than in the lower region before the occupant comes into contact with the expanded and deployed airbag, and as such, when the head of the occupant advances into the upper part of the expanded airbag, the front side of the upper region of the airbag goes over the upper end part of the rim of the steering wheel and comes into contact with interior parts such as the instrument panel, where the interior parts function as the reaction surface for the airbag. As a result, the deployment posture of the airbag is stabilized, and the head of the occupant can be appropriately restrained.

With the present invention, a space is preferably formed between the upper region of the airbag and the interior parts of the vehicle located in front of the steering wheel in the stage before the occupant comes into contact with the expanded and deployed airbag. After the occupant comes into contact with the expanded and deployed airbag, the airbag has at least a part of the upper region of the airbag advanced to the front of the vehicle from the rim and comes into contact with the interior parts.

The "stage before the occupant comes into contact with the expanded and deployed airbag" means the initial state of the airbag being deployed. "Interior parts located in front of the steering wheel" means the entirety of interior parts in front of the driver seat under the front windshield. "Space is formed" means a state in which they are not in contact with each other. "After the occupant comes into contact with the expanded and deployed airbag" means after a situation such as a frontal collision of the vehicle occurs and the occupant advances into the airbag, that is, the collision energy of the occupant begins to become absorbed by the airbag. In addition, "at least a part of the upper region of the airbag advances to the front of the vehicle from the rim" means that the upper part of the airbag moves forward over the steering wheel rim and forward (to the interior parts side) due to an impact where the occupant collides with the airbag.

As the present invention is configured such that a space is formed between the upper region of the airbag and the interior parts at the stage of initial deployment, and that the upper region of the airbag contacts the interior parts after the occupant comes into contact with the expanded and deployed airbag, the interior parts can be used as a reaction force surface while minimizing the increase in capacity of the airbag.

If the airbag is configured to include a protruding portion that protrudes forward, the front surface of the airbag can be brought into contact with interior parts such as the instrument panel from the initial stage of deployment, but in this case, as the capacity of the airbag increases, the capacity of the gas generating device must also be increased accordingly. However, since the space for accommodating the airbag device inside the steering wheel is small and limited, the size (capacity) of the airbag and inflator is preferably as compact as possible.

With the present invention, the thicknesses D1 and D2 of the upper end part and lower end part of the airbag are measured from the surface of the rim of the steering wheel, which can be specified as the thickness of the upper end part (highest part) and the thickness of the lower end part (lowest part) of the airbag in the direction parallel to the rotation axis of the steering wheel.

Under the condition that the occupant is an AM50 equivalent as specified in the collision safety performance evaluation standard based on FMVSS208 (US Federal Motor Vehicle Safety Standard) and collides with a full [width] rigid barrier with or without wearing a standard seatbelt, the timing at which the upper region of the airbag comes into contact with the interior parts can be configured to be 50 ms to 90 ms after the collision of the vehicle with the full [width] rigid barrier and preferably is configured to be 60 ms to 80 ms after the collision.

The timing can be set under the condition that collision with the full [width] rigid barrier occurs at a speed of 25 mph where the occupant is not wearing a seat belt.

By setting the timing at which the upper region of the airbag comes into contact with the interior parts located in front of the steering wheel as described above, the reaction force from the interior parts can be received at the optimum timing, and the occupants are appropriately protected.

The ratio D1:D2 of the thickness D1 of the upper end part and the thickness D2 of the lower end part of the airbag can be in the range of 1.1:1 to 2.3:1. If the ratio deviates from such a range, unfavorable outcomes may occur. In other words, if the thickness D1 of the upper end part of the airbag is larger than the above range with respect to the thickness D2 of the lower end part, there is a fear of the capacity of the airbag becoming large or the protection of the body portion of the occupant becoming insufficient. On the other hand, if the thickness D1 of the upper end part of the airbag is smaller than the above range with respect to the thickness D2 of the lower end part, sufficient reaction force cannot be obtained even if the front side of the upper region of the airbag comes into contact with the interior parts, making maintaining restraining performance of the occupant difficult.

When the thickness of the intermediate portion between the upper end part and the lower end part of the airbag is set to D0 in the stage before the occupant comes into contact with the expanded and deployed airbag, the intermediate portion can be configured so that D1>D0>D2. By setting up in this manner, the deployed shape of the airbag becomes relatively smooth, enabling suppressing an increase in the capacity of the airbag.

The thickness D0 of the intermediate portion can be formed so as to be gradually changed so as to continuously decrease from the upper end part to the lower end part.

Viewing the expanded and deployed airbag from the side, the intermediate portion of the portion below the center of rotation of the steering wheel can have a recessed part that makes the airbag partially thinner in the vehicle front-to-back direction than the surrounding portions.

In the expanded and deployed airbag, the length L2 of the portion lower than the center of rotation of the steering wheel can be configured to be longer than the length L1 of the portion above the center of rotation of the steering wheel. Here, the lengths L2 and L1 can be defined as the lengths in the direction extending parallel to the surface of the rim, orthogonal to the rotation axis of the steering wheel when the deployed airbag is viewed from the side.

As described above, by lengthening the lower portion of the deployed airbag, it is possible to reliably protect the area around the abdomen of the occupant and avoid an unfavorable situation such as the area around the abdomen colliding with the steering wheel.

The airbag may have a structure including a rear panel facing the occupant, a front panel opposite the rear panel, and side panels connecting the rear panel and the front panel. Such a panel configuration enables easy adjustment of the thickness of the deployed airbag in the front-to-back direction. Here, a vent hole can be formed in the side panel. If a vent hole is formed on the front panel, the vent hole may be blocked by coming into contact with an interior part such as the instrument panel. In this regard, by forming a vent hole in the side panel, such a problem can be avoided.

A structure can be used in which the rear panel and the upper portion of the front panel are connected via the side panels, the side panels do not exist in the lower portion of the rear panel and the front panel, and the rear panel and the front panel are directly connected. Alternatively, the side panels can be provided over the entire circumference of the rear panel and the front panel.

MODE FOR CARRYING OUT THE INVENTION

The airbag device according to the present invention will be described with reference to the accompanying drawings.

In the description below, when an occupant is seated in a seat in a normal posture, the direction the occupant faces is referred to as the "front," the opposite direction is referred to as the "back," and the direction indicating the coordinate axis is referred to as the "front-to-back direction." Moreover, when the passenger is seated in the seat in a regular posture, the right of the passenger is referred to as the "right direction," the left of the passenger is referred to as the "left direction," and the direction indicating the coordinate axis is referred to as the "left and right direction." Similarly, when the passenger is seated in the seat in a regular posture, the head direction of the passenger is referred to as "up," the waist direction of the passenger is referred to as "down," and the direction indicating the coordinate axis is referred to as the "vertical direction."

Note that as described above, the twelve o'clock, 3 o'clock, 6 o'clock, and 9 o'clock directions are positions when the steering wheel is regarded as a clock face, but the direction of the steering wheel when the vehicle is traveling straight is the standard, where upward or direction of travel is twelve o'clock. Based on the twelve o'clock position when the driver looks forward, a position rotated clockwise by 90 degrees is 3 o'clock, a position rotated by 180 degrees is 6 o'clock, and a position rotated by 270 degrees is 9 o'clock.

Figure 1:
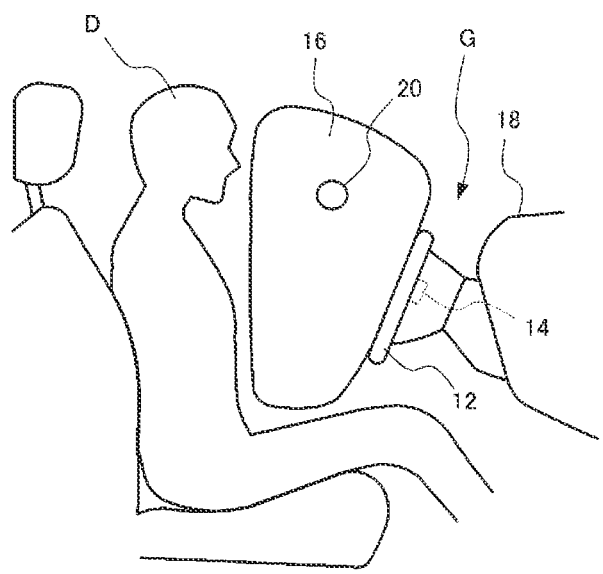
FIG. 1 is a side surface view illustrating a state immediately after the airbag device according to the present invention is activated and an airbag has expanded and deployed.
Figure 1:
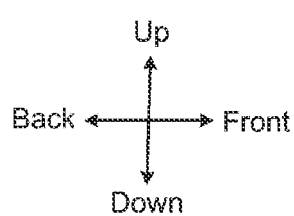
Figure 2:
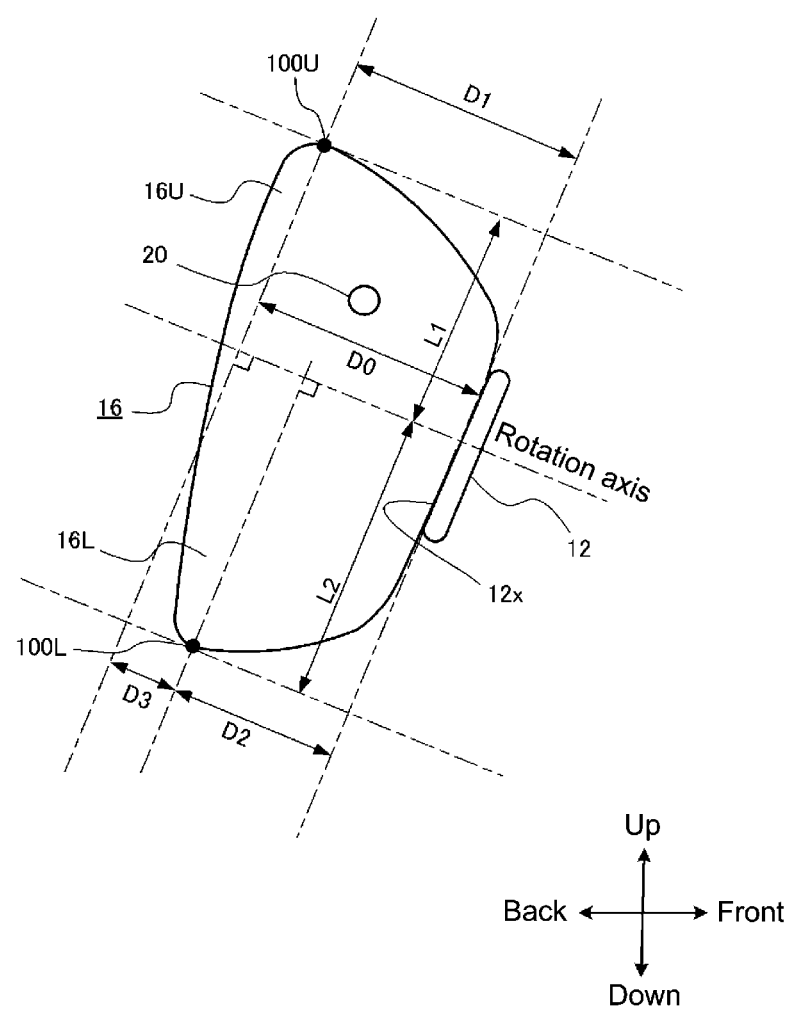
FIG. 2 is a schematic diagram (side surface view) illustrating a deployed form of the airbag according to the present invention.
Figure 3:
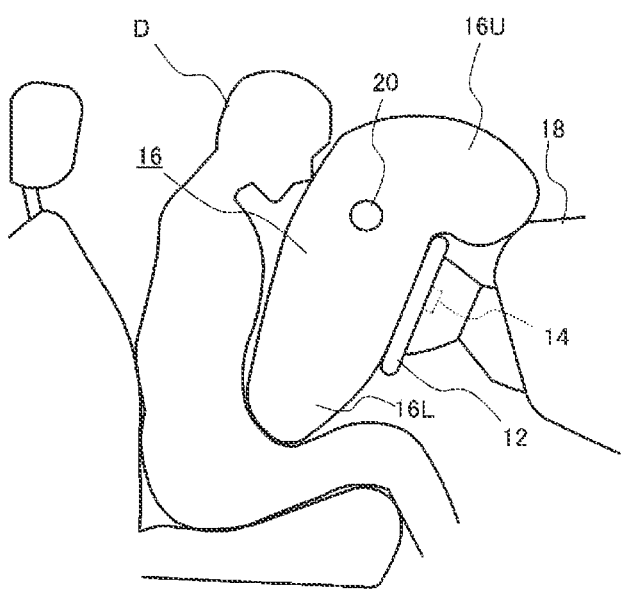
FIG. 3 is a side surface view illustrating a state in which an occupant advances into (contacts) an airbag that has expanded and deployed due to the airbag device according to the present invention being activated.
Figure 3:
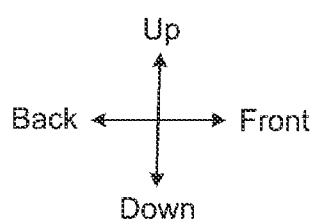
Figure 4A:
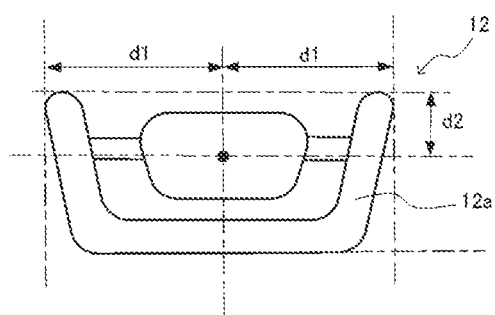
FIGS. 4(A), (B), and (C) are plan views illustrating the steering wheel shapes of a vehicle applicable to the present invention.

FIG. 1 is a side surface view illustrating the state inside a vehicle where the airbag device according to the present invention has activated (where the airbag has expanded and deployed). FIG. 2 is a schematic diagram (side surface view) illustrating a deployed form of the airbag according to the present invention. FIG. 3 is a side surface view illustrating a state in which an occupant advances into (contacts) an airbag that has expanded and deployed due to the airbag device according to the present invention being activated. FIGS. 4(A), (B), and (C) are plan views illustrating variations of steering wheel shapes applicable to the present invention.

The airbag device according to the present invention, for example, as illustrated in FIGS. 4(A), (B), and (C), is mounted on a steering wheel 12 with a rim 12a with an irregular shape where the distance d2 from the center of rotation to the upper edge part is shorter compared to the distance d1 from the center of rotation to the left and right edge parts, or in other words, the up-down direction or just the upper part of the steering wheel is squished compared to a circle.

Figure 4B:
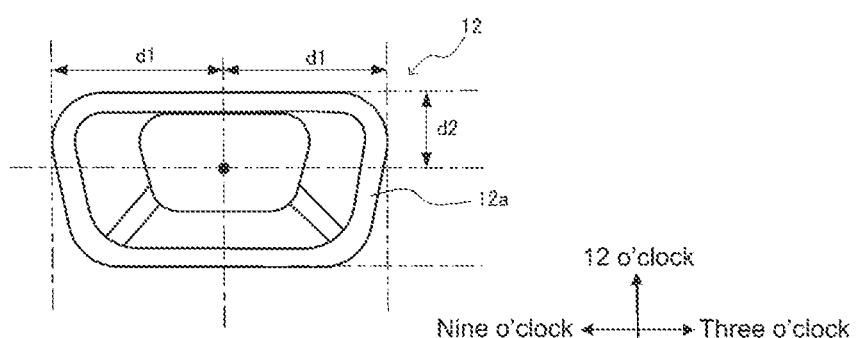
Figure 4C:
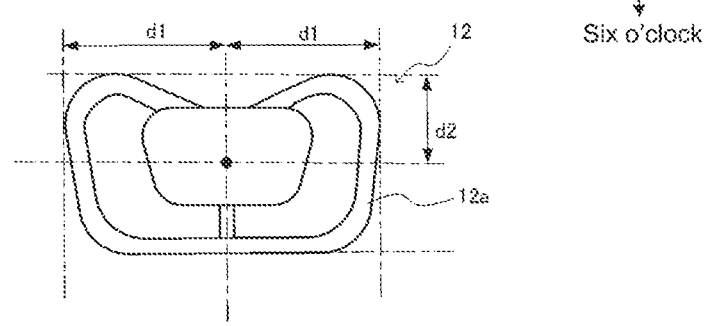

The steering wheel 12 illustrated in FIG. 4(A) has a shape in which the vicinity corresponding to twelve o'clock is missing from the generally used circular (annular) rim. The steering wheel 12 illustrated in FIG. 4(B) has a shape in which the vicinity corresponding to twelve o'clock extends horizontally without being convexly curved. In addition, the steering wheel 12 illustrated in FIG. 4(C) has a shape in which the vicinity corresponding to twelve o'clock is not convexly curved but is recessed in a concave shape. Steering wheels to which the present invention is applicable is not limited to the above-mentioned three patterns, and present invention can be applied to various types of steering wheels having a shape where sufficient reaction force can not be obtained near twelve o'clock on the rim when the airbag is deployed.

As illustrated in FIG. 1, the airbag device according to present invention includes a gas generating device 14 that generates an expansion gas and an airbag 16 that expands and deploys toward the occupant (driver) D side due to the expansion gas. Furthermore, in the stage before the occupant D comes into contact with the expanded and deployed airbag 16, a space G is formed between the upper region 16U of the airbag 16 and the instrument panel 18 of the vehicle located in front of the steering wheel 12.

As illustrated in FIG. 2, the thickness D2 of the lower region 16L of the airbag 16 is configured to be smaller than the thickness D1 of the upper region 16U at a stage before the occupant D comes into contact with the expanded and deployed airbag 16. The thicknesses D1 and D2 are measured from the surface 12x of the rim of the steering wheel 12, which can be specified as the thickness of the upper end part (highest part) 100O and the thickness of the lower end part (lowest part) 100 L of the airbag 16 in the direction parallel to the rotation axis of the steering wheel 12. Here, the upper end part 100O and the lower end part 100L of the airbag 16 can be the farthest points above and below the rotation axis in the direction perpendicular to the rotation axis of the steering wheel 12.

The ratio of the thicknesses D1 and D2 is preferably in the range of 1.1:1 to 2.3:1. For example, the thickness D1 can be 350 mm to 400 mm, preferably 355 mm, and the thickness D2 can be 250 mm to 320 mm, preferably 300 mm. The difference D3 between the thicknesses D1 and D2 can be set to about 50 mm. Furthermore, the thickness DO at the position corresponding to the rotation axis of the steering control system 2 is preferably set to a value such that a relationship of D1>D0>D2 is established.

In the present Embodiment, the thicknesses D1 and D2 of the airbag 16 are set as described above, but when the thickness D1 of the upper region 16U is larger than the above range with respect to the lower region 16L, there is a risk that the capacity of the airbag 16 will become large or that the protection of the body portion of the occupant D will be insufficient. On the other hand, if the thickness D1 of the upper region 16U of the airbag 16 is smaller than the above range with respect to the lower region 16L, there is a possibility that a sufficient reaction force cannot be obtained even if the front side of the upper region 16U comes into contact with the instrument panel 18. In other words, by setting the thicknesses D1 and D2 of the airbag 16 in the front-to-back direction as described above, the restraint performance of the occupant D can be appropriately maintained.

In addition, in the expanded and deployed airbag 16, the length L2 of the portion below the center of rotation of the steering wheel 12 is set to be longer than the portion L1 on the upper side. By lengthening the lower portion L2 of the deployed airbag 16, as illustrated in FIG. 3, the area in the vicinity of the abdomen of the occupant D is reliably protected, and an unfavorable situation such as the area in the vicinity of the abdomen colliding with the steering wheel 12 can be avoided.

As illustrated in FIG. 3, after the occupant D comes into contact with the expanded and deployed airbag 16, at least a part of the upper region 16U of the airbag 16 advances to the front of the vehicle from the steering wheel 12, coming into contact with the instrument panel 18.

For example, under the conditions that the occupant D is AM50 equivalent as specified in the collision safety performance evaluation standard based on FMVSS208 (US Federal Motor Vehicle Safety Standard) and collides with a full [width] rigid barrier with or without wearing a seatbelt, the timing at which the upper region 16U of the airbag 16 comes into contact with the instrument panel 18 is configured to be 50 ms to 90 ms after the collision of the vehicle with the barrier. More preferably, this contact is 60 ms to 80 ms after the collision. Here, the timing as described above can also be set under the condition that the occupant D collides with the full [width] rigid barrier at a speed of 25 mph without wearing a seat belt.

By setting the timing at which the upper region 16U of the airbag 16 comes into contact with the instrument panel 18 located in front of the steering wheel 12 as described above, the airbag 16 can receive a reaction force from the instrument panel 18 at optimal timing, enabling appropriate protection of the occupant D.

According to the present invention having the above configuration, the thickness of the airbag 16 in the front-to-back direction is larger in the upper region 16U than in the lower region 16L before the occupant comes into contact with the expanded and deployed airbag 16, and as such, when the head of the expanded occupant D advances into the upper part of the expanded airbag 16, the front side of the upper region 16U of the airbag 16 goes over the upper end part of the rim of the steering wheel 12 and comes into contact with the instrument panel 18, where the instrument panel 18 functions as the reaction surface of the airbag (see FIG. 3).

As a result, the deployment posture of the airbag 16 is stabilized, and the head of the occupant D can be appropriately restrained. In other words, when the head of the occupant D collides with the deployed airbag 16, the amount of movement of the head to the front can be minimized.

Figure 5A:
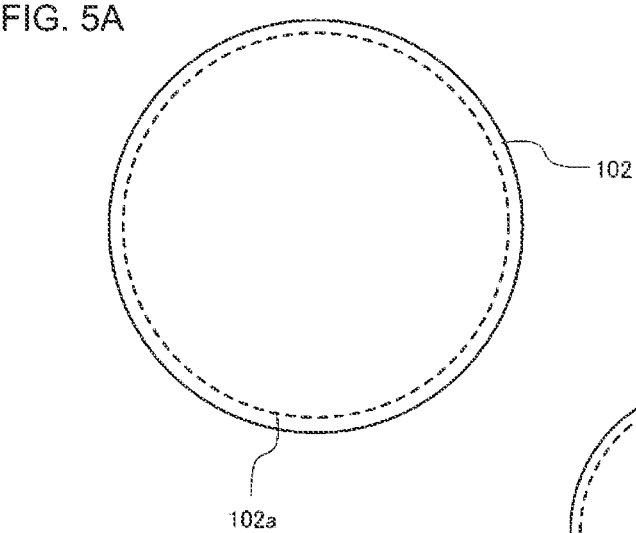
FIG. 5 is a plan view illustrating a panel structure of the airbag according to Embodiment 1 of the present invention.
Figure 5B:
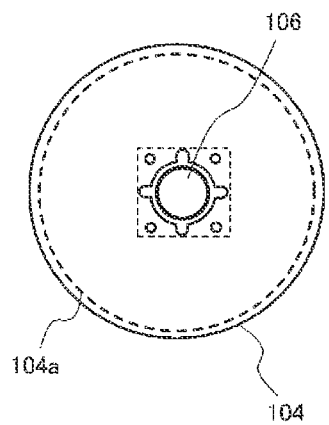
Figure 5C:
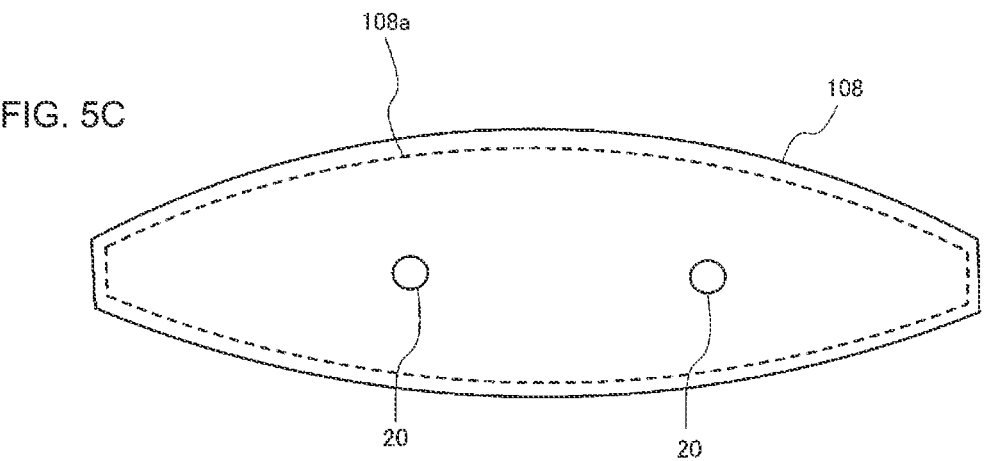
Figure 6:
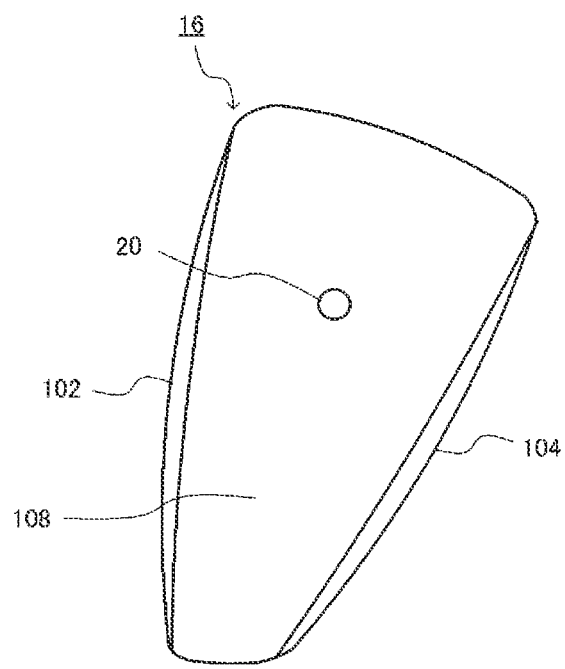
FIG. 6 is a side surface view illustrating a state where the airbag with the panel structure illustrated in FIG. 5 is deployed.
Figure 6:
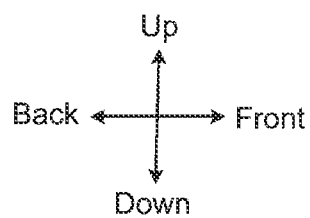

FIG. 5 is a plan view illustrating a panel structure of the airbag 16 according to Embodiment 1 of the present invention. FIG. 6 is a side surface view illustrating a state where the airbag 16 with the panel structure illustrated in FIG. 5 is deployed.

In the present Embodiment, the airbag 16 is formed from a rear panel 102 facing the occupant D, a front panel 104 opposite the rear panel 102, and side panels 108 connecting the rear panel 102 and the front panel 104. An opening portion 106 in which the gas generating device 14 is installed is formed in the center of the front panel 104. Vent holes 20 are formed on both the left and right sides of the side panels 108. Furthermore, the airbag 16 having a deployed shape as illustrated in FIG. 6 is configured by sewing the panels 102, 104, 108 to each other along the sewing lines 102a, 104a, 108a. In the present Embodiment, the side panels 108 are provided over the entire circumference of the rear panel 102 and the front panel 104.

Figure 7A:
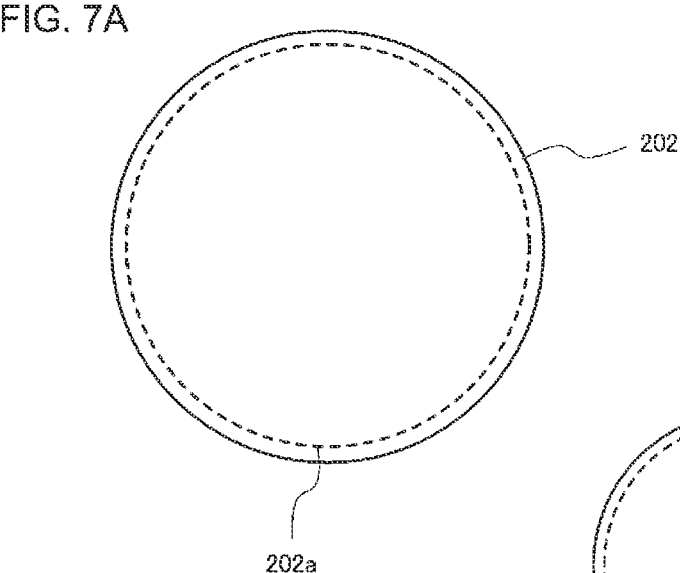
FIG. 7 is a plan view illustrating a panel structure of the airbag according to Embodiment 2 of the present invention.
Figure 7B:
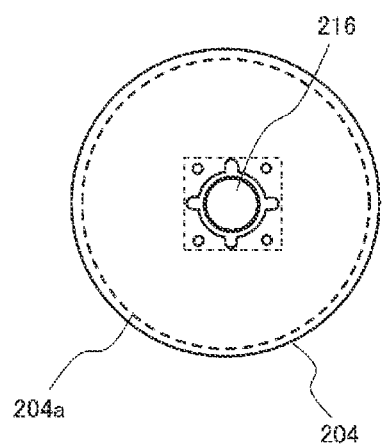
Figure 7C:
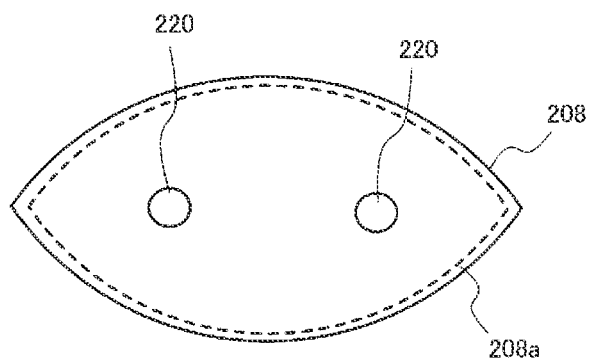
Figure 8:
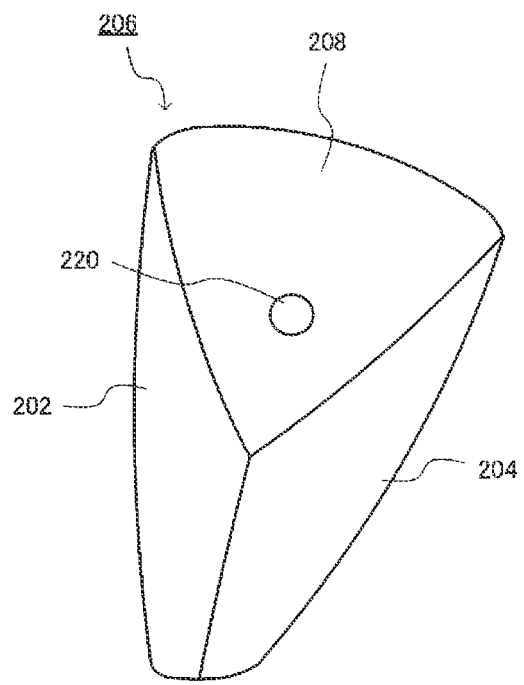
FIG. 8 is a side surface view illustrating a state where the airbag with the panel structure illustrated in FIG. 7 is deployed.
Figure 8:
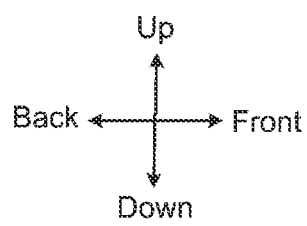

FIG. 7 is a plan view illustrating a panel structure of the airbag 206 according to Embodiment 2 of the present invention. FIG. 8 is a side surface view illustrating a state where the airbag 206 with the panel structure illustrated in FIG. 7 is deployed.

In the present Embodiment, the airbag 206 is formed from a rear panel 202 facing the occupant D, a front panel 204 opposite the rear panel 202, and side panels 208 connecting the rear panel 202 and the front panel 204. An opening 216 in which the gas generating device 14 is installed is formed in the center of the front panel 204. Vent holes 220 are formed on both the left and right sides of the side panels 208. Furthermore, the airbag 206 having a deployed shape as illustrated in FIG. 8 is configured by sewing the panels 202, 204, 208 to each other along the sewing lines 202a, 204a, 208a. In the present Embodiment, the structure is such that the rear panel 202 and the upper portion of the front panel 204 are connected via the side panel 208, the side panel 208 is not present in the lower portion of the rear panel 202 and the front panel 204, and the rear panel 202 and the front panel 204 are sewn together directly.

Figure 9:
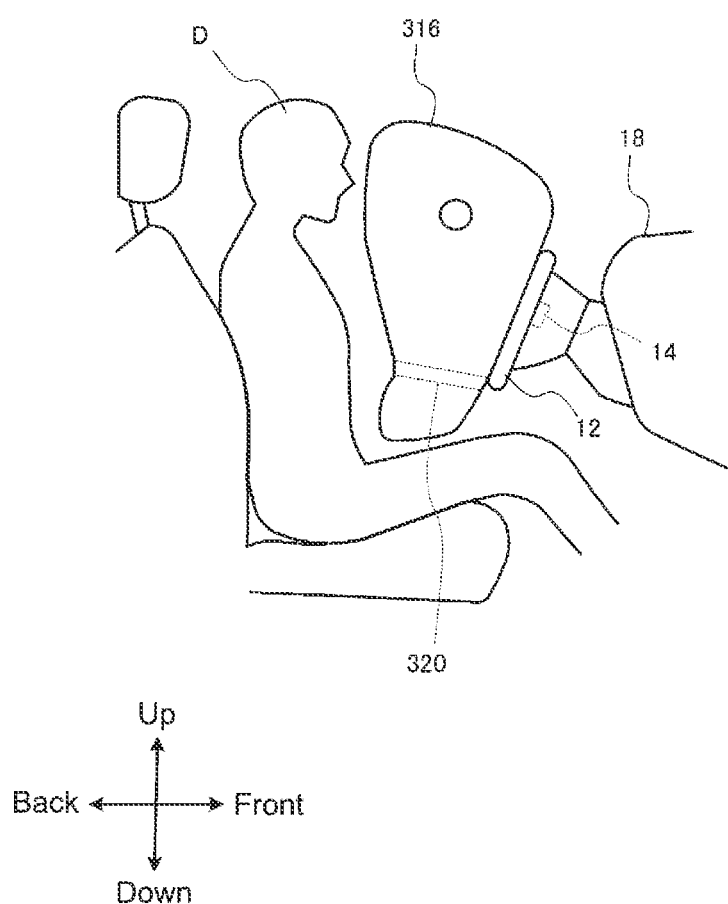
FIG. 9 is a side surface view illustrating the state inside a vehicle where the airbag device according to Embodiment 3 of the present invention has activated (where the airbag has expanded and deployed).

FIG. 9 is a side surface view illustrating a state where the airbag device according to Embodiment 3 of the present invention has activated (where the airbag has expanded and deployed). In the present Embodiment, a tether 320 is connected to the lower portion inside the airbag 316 to regulate the width (thickness) in the front-to-back direction. With such a structure, an appropriate (non-excessive) amount of gas flows through the region of the airbag 316 located near the abdomen of the occupant D, and the deployment behavior can be optimized, such as the deployment speed, deployment shape, and the like of the entire airbag 316.

Figure 10A:
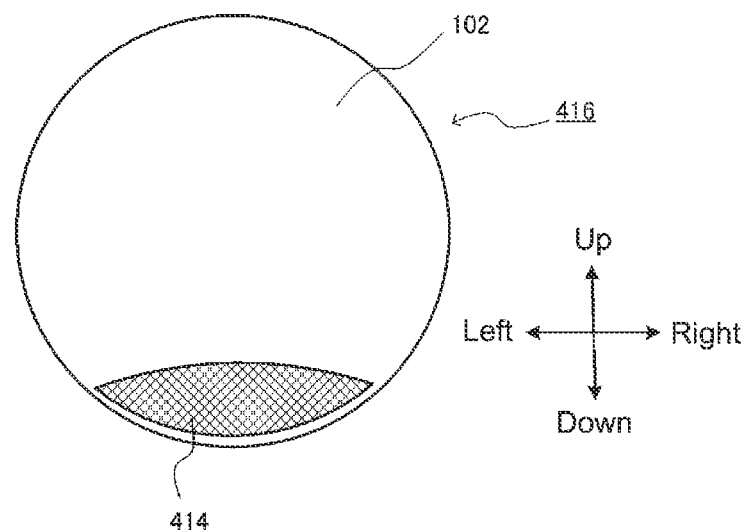
FIG. 10 is a front view (A) and side surface view (B) illustrating the deployed state of the airbag according to Embodiment 4 of the present invention.
Figure 10B:
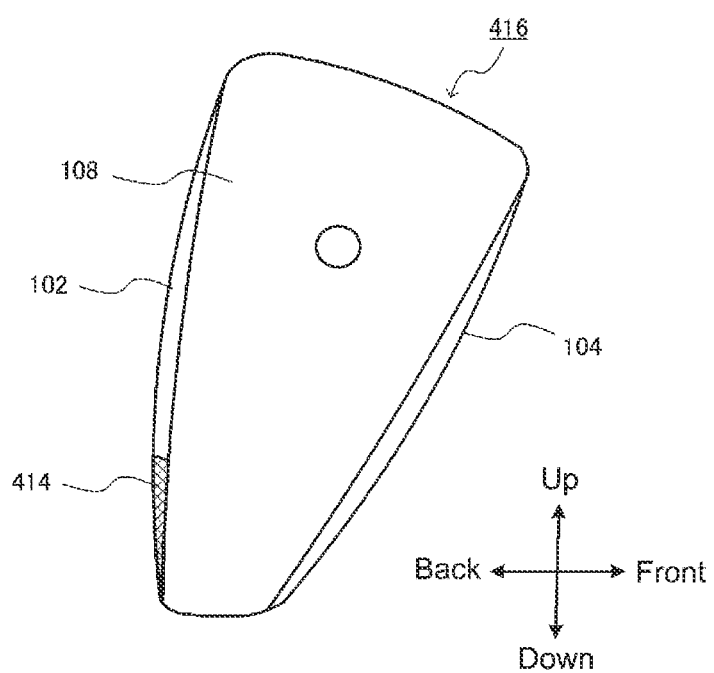

FIG. 10 is a front view (A) and side surface view (B) illustrating the deployed state of the airbag 416 according to Embodiment 4 of the present invention. The present Embodiment is an airbag 416 in which the airbag 16 of the Embodiment 1 illustrated in FIG. 5 and FIG. 6 is arranged. In other words, the airbag 416 has a non-slip region 414 having a friction coefficient $\mu$ of 2.0 or more relative to the airbag 16 of Embodiment 1 formed at the lower end part of the rear panel 102 facing the occupant D. The non-slip region 414 can be formed by applying a material having a large coefficient of friction (silicon or the like) or attaching a panel (cloth) having a high coefficient of friction on the surface. When the airbag 416 expands and deploys, the non-slip region 414 is located near the abdomen of the occupant to prevent the airbag 416 from slipping and moving in the vertical direction relative to the occupant. In other words, the relative positional relationship between the airbag 416 and the occupant can be maintained at an appropriate position.

FIG. 11 is a side surface view illustrating the airbag according to Embodiment 5 of the present invention in a deployed state, where (A) is a state of initial deployment and (B) is a state of full deployment. In the present Embodiment, a diffuser 500 is provided around the inflator (14) in the airbag 106. The diffuser 500 includes an opening 500a for guiding the gas downward and a vent hole 500b for discharging the gas to the side.

Figure 11A:
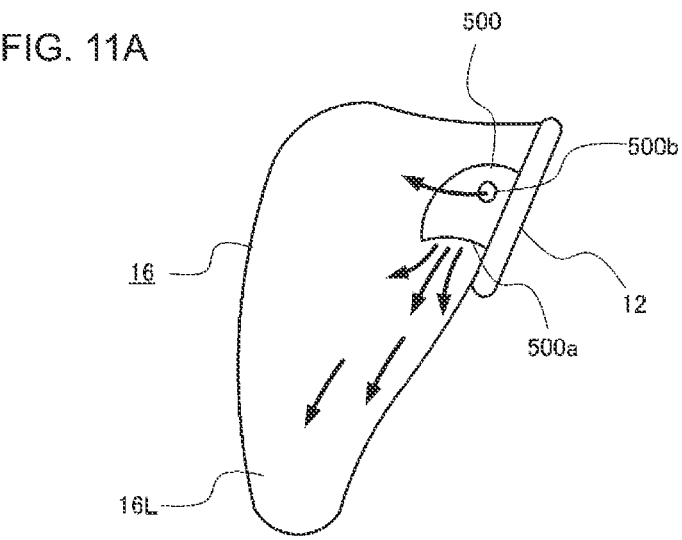
FIG. 11 is a side surface view illustrating the airbag according to Embodiment 5 of the present invention in a deployed state, where (A) is a state of initial deployment and (B) is a state of full deployment.

In the initial stage of deployment of the airbag 16, as illustrated in FIG. 11(A), the gas is guided downward by the diffuser 500, and the lower region 16L of the airbag 16 starts deploying first. Since the lower region 16L of the airbag 16 is first deployed, the airbag 16 reaches the vicinity of the abdomen of the occupant, reducing the problem caused by collision with the steering wheel 12.

Figure 11B:
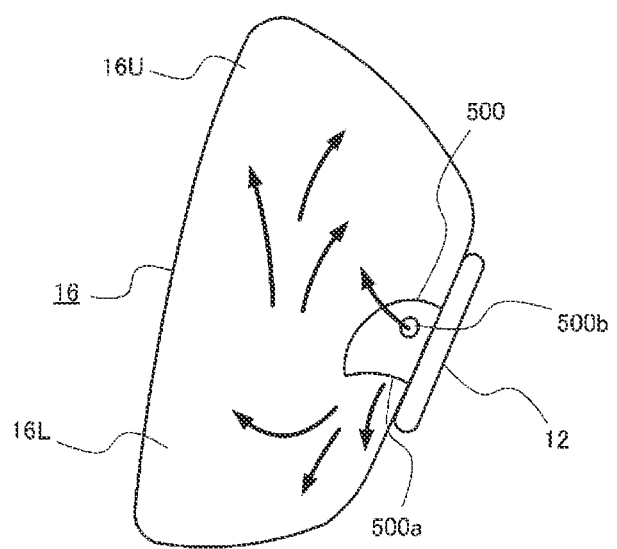

Afterwards, as illustrated in FIG. 11(B), the gas also flows into the upper region 16U of the airbag 16 and the airbag 16 is fully deployed. In the present Embodiment, the airbag 16 can be deployed (wedged in front of) in front of the abdomen of the occupant more quickly than in the other Embodiments 1 to 4 described above.

Embodiments of the present invention have been described above. However, the present invention is in no way limited by these embodiments and may be changed within a scope of technical ideas set forth in the patent claims.

The invention claimed is:

1. An airbag device mounted on a steering wheel of a vehicle, the steering wheel having a rim with a shape where a distance from a center of rotation of the steering wheel to an upper edge part is shorter than a distance to right and left edge parts thereof, comprising:
- a gas generating device that generates expansion gas; and
- an airbag configured to expand and deploy towards an occupant due to the expansion gas; wherein
the airbag is configured such that, at a stage before the occupant comes into contact with the expanded and deployed airbag, when viewing the airbag from a side of the vehicle, a thickness D1 of an upper end part of the airbag is larger than a thickness D2 of a lower end part in a direction parallel to a rotation axis of the steering wheel,
wherein a length of a portion of the airbag lower than the center of rotation of the steering wheel is longer than a length of a portion of the airbag that is higher than the center of rotation, and
wherein a space is formed between the upper end part of the airbag and an instrument panel of the vehicle in the stage before the occupant comes into contact with the expanded and deployed airbag such that the expanded and deployed airbag is behind the steering wheel on an occupant side of the steering wheel, and the airbag is configured so that after the occupant comes into contact with the expanded and deployed airbag at least a part of the upper end part of the airbag advances to the front of the vehicle from behind the steering wheel and comes into contact with the instrument panel.

2. The airbag device according to claim 1, wherein
under the condition that the occupant is an AM50 equivalent as specified in a collision safety performance evaluation standard based on US Federal Motor Vehicle Safety Standard FMVSS208 and a collision with a full rigid barrier with or without wearing a standard seatbelt,
a timing at which the upper end part of the airbag comes into contact with the instrument panel is 50 ms to 90 ms after the collision of the vehicle with the full rigid barrier.

3. The airbag device according to claim 2, wherein the timing is set under a condition that the occupant collides with the full rigid barrier at a speed of 25 mph without wearing the standard seatbelt.

4. The airbag device according to claim 2, wherein the timing is 60 ms to 80 ms after the collision of the vehicle with the full rigid barrier.

5. The airbag device according to claim 1, wherein a ratio D1:D2 of the thickness D1 of the upper end part of the airbag to the thickness D2 of the lower end part is in a range of 1.1:1 to 2.3:1.

6. The airbag device according to claim 1, wherein
the airbag is configured such that at a stage before the occupant comes into contact with the expanded and deployed airbag, when a thickness of an intermediate portion between the upper end part and the lower end part of the airbag is D0,
the intermediate portion is configured such that D1>D0>D2.

7. The airbag device according to claim 6, wherein the thickness of the intermediate portion is gradually changed so as to continuously decrease from the upper end part to the lower end part.

8. The airbag device according to claim 1, wherein
an intermediate portion of a portion of the airbag below the center of rotation of the steering wheel can have a recessed part that makes the airbag partially thinner in a vehicle front-to-back direction than surrounding portions of the airbag.

9. The airbag device according to claim 1, wherein the airbag includes:
a rear panel configured to face the occupant, a front panel opposite the rear panel, and one or more side panels connecting the rear panel and the front panel.

10. The airbag device according to claim 9, wherein vent holes are formed in the one or more side panels.

11. The airbag device according to claim 9, wherein an upper portion of the rear panel and the front panel are connected via the one or more side panels, the one or more side panels are not present in a lower portion of the rear panel and the front panel, and the rear panel and the front panel are directly connected in the lower portion.

12. The airbag device according to claim 9, wherein the one or more side panels are provided over an entire circumference of the rear panel and the front panel.

* * * * *